United States Patent [19]

Tiffin et al.

[11] Patent Number: 4,671,369
[45] Date of Patent: Jun. 9, 1987

[54] STAIR-CLIMBING WHEELCHAIR WITH MEANS FOR CUSHIONING VERTICAL MOVEMENTS THEREOF

[75] Inventors: Patrick J. Tiffin, San Luis Obispo; Baxter R. Watkins, Foster City, both of Calif.

[73] Assignee: Gordon W. Rosenberg, San Ardo, Calif.

[21] Appl. No.: 782,678

[22] Filed: Oct. 1, 1985

[51] Int. Cl.⁴ .............................................. B62D 55/04
[52] U.S. Cl. ..................................... 180/8.1; 180/8.2; 180/8.7; 180/9.1; 180/9.22; 180/9.28; 180/9.3; 180/9.32; 180/9.62; 180/907; 297/DIG. 4
[58] Field of Search ................... 180/8.1, 8.2, 8.3, 8.4, 180/8.7, 9, 9.1, 9.21, 9.22, 9.26, 9.28, 9.3, 9.32, 9.34, 9.62, 907, 9.36; 280/5.2, 5.22, 5.28, 5.32; 297/DIG. 4

[56] References Cited

U.S. PATENT DOCUMENTS 2,012,090  8/1935  Straussler ........................... 180/9.32
3,231,290  1/1966  Weyer ................................ 280/5.22
4,044,850  8/1977  Winsor ............................... 180/9.26
4,564,080  1/1986  Pagett ................................. 180/8.2

Primary Examiner—John J. Love
Assistant Examiner—Mitchell J. Hill
Attorney, Agent, or Firm—Townsend and Townsend

[57] ABSTRACT

A stair-climbing wheelchair having wheels defining a first wheel base and a pair of endless, flexible tracks providing a second wheel base, there being a motor-driven structure for moving the tracks into and out of ground-engaging positions. A first pivotal arm is pivotally mounted on the wheelchair near the front end thereof. The first arm is coupled to a fluid piston and cylinder assembly which actuates and cushions the pivotal movement of the arm as the wheelchair moves from a horizontal position to an inclined position, such as moving from the top of a stairway to the slope of the stairway as the wheelchair moves down the stairway. Similarly, a second arm coupled with a fluid piston and cylinder assembly is coupled to the wheelchair to cushion the movement of the wheelchair and its occupant as they move from an inclined position to a generally horizontal position, such as at the top of a stairway.

5 Claims, 12 Drawing Figures

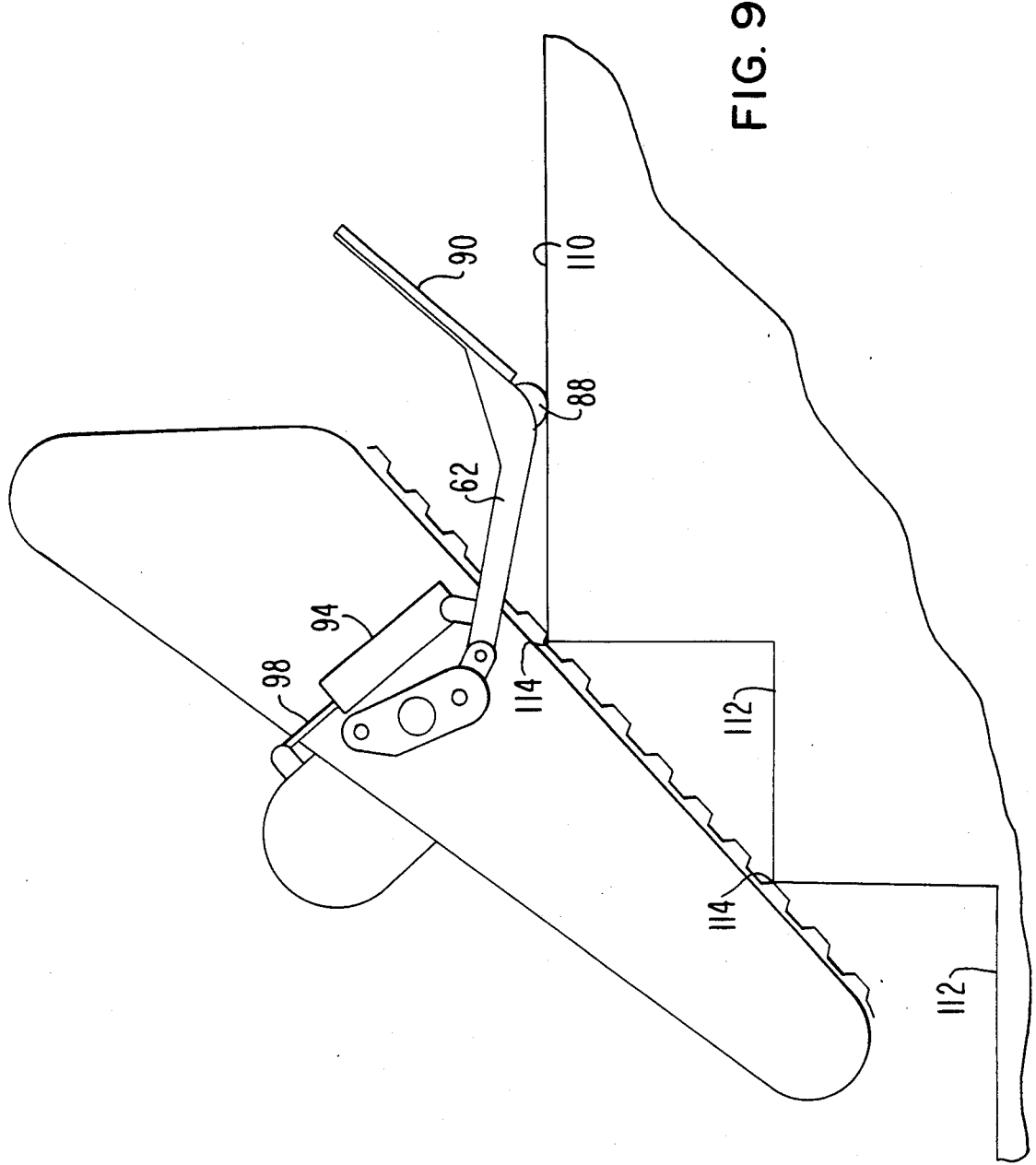

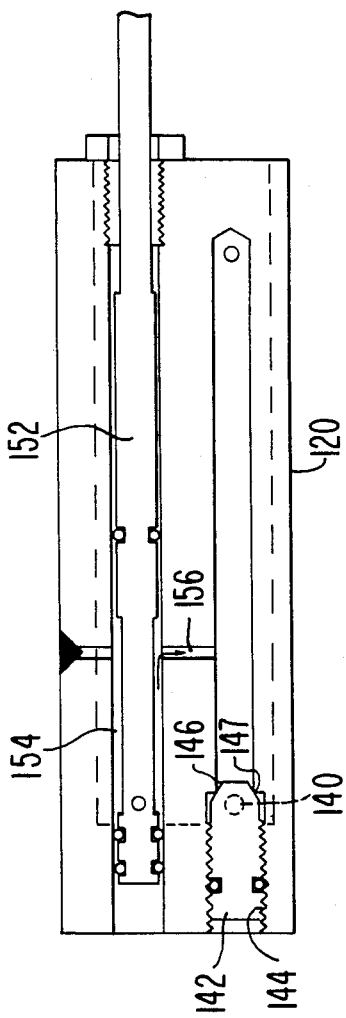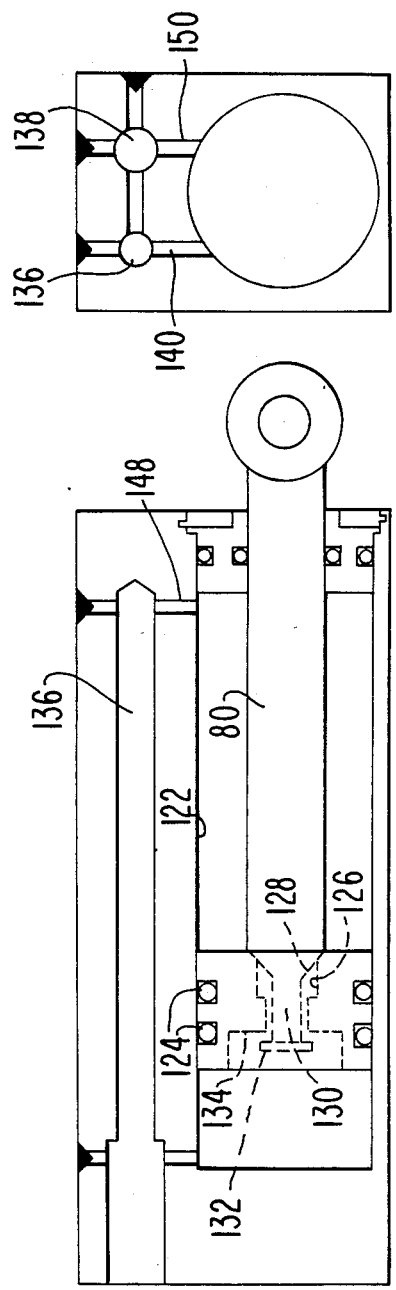

STAIR-CLIMBING WHEELCHAIR WITH MEANS FOR CUSHIONING VERTICAL MOVEMENTS THEREOF

This invention relates to improvements in wheelchairs and similar movable objects and, more particularly, to a stair-climbing wheelchair having means for cushioning the movement of the wheelchair as it moves from an inclined to a horizontal position and from a horizontal position to an inclined position.

BACKGROUND OF THE INVENTION

An improved wheelchair for climbing stairs and inclined ramps has been described in U.S. patent application Ser. No. 461,654, filed Jan. 27, 1983, now U.S. Pat. No. 4,564,080. The wheelchair in this disclosure includes a number of features which permit a wheelchair or similar conveyance to change from a first wheel base comprised of ground-engaging wheels to a second wheel base comprised of a pair of endless, flexible tracks when the wheelchair is to be moved up or down an inclined path. The wheels and tracks are motor-driven, and a suitable control is provided to allow for forward and reverse movements of the wheelchair as well as turning movements of the wheelchair.

It has been found that, with a wheelchair of the type described, it is desirable to avoid rapid downward movements as the wheelchair moves from a horizontal path to an inclined path and as the wheelchair moves from an inclined path to a horizontal path. Such movements are rapid and cause an impact with a surface which causes discomfort to the user of the wheelchair, a condition to be avoided. Thus, a need has arisen for improvements in the way in which the wheelchair moves between horizontal and inclined paths to avoid such discomfort to the wheelchair user. The present invention satisfies this need.

SUMMARY OF THE INVENTION

This invention is directed to a wheelchair of the type described which has cushioning means thereon at the front and rear ends of the wheelchair so that, as the wheelchair moves from a horizontal path to an inclined path, the wheelchair is gently lowered into an inclined position without causing discomfort to the user of the wheelchair. Similarly, as the wheelchair moves up an inclined path and moves from the inclined position to a horizontal position at the top of the path, the wheelchair is gently lowered into its horizontal position, again without discomfort to the user.

The primary object of the present invention is to provide a stair-climbing wheelchair having cushioning means thereon to avoid discomfort to the user of the wheelchair when the wheelchair is moved from a horizontal path to an inclined path and from an inclined path to a horizontal path.

Other objects of this invention will become apparent as the following specification progresses, reference being had to the accompanying drawings for an illustration of the invention.

IN THE DRAWINGS

FIG. 9 is a view similar to FIG. 8 but showing the wheelchair as it ascends along an inclined path;

FIG. 10 is a schematic view of an improved fluid piston and cylinder assembly of the cushioning means; and FIGS. 11 and 12 are schematic side and end views, respectively, of the assembly of FIG. 10.

Figure 1:
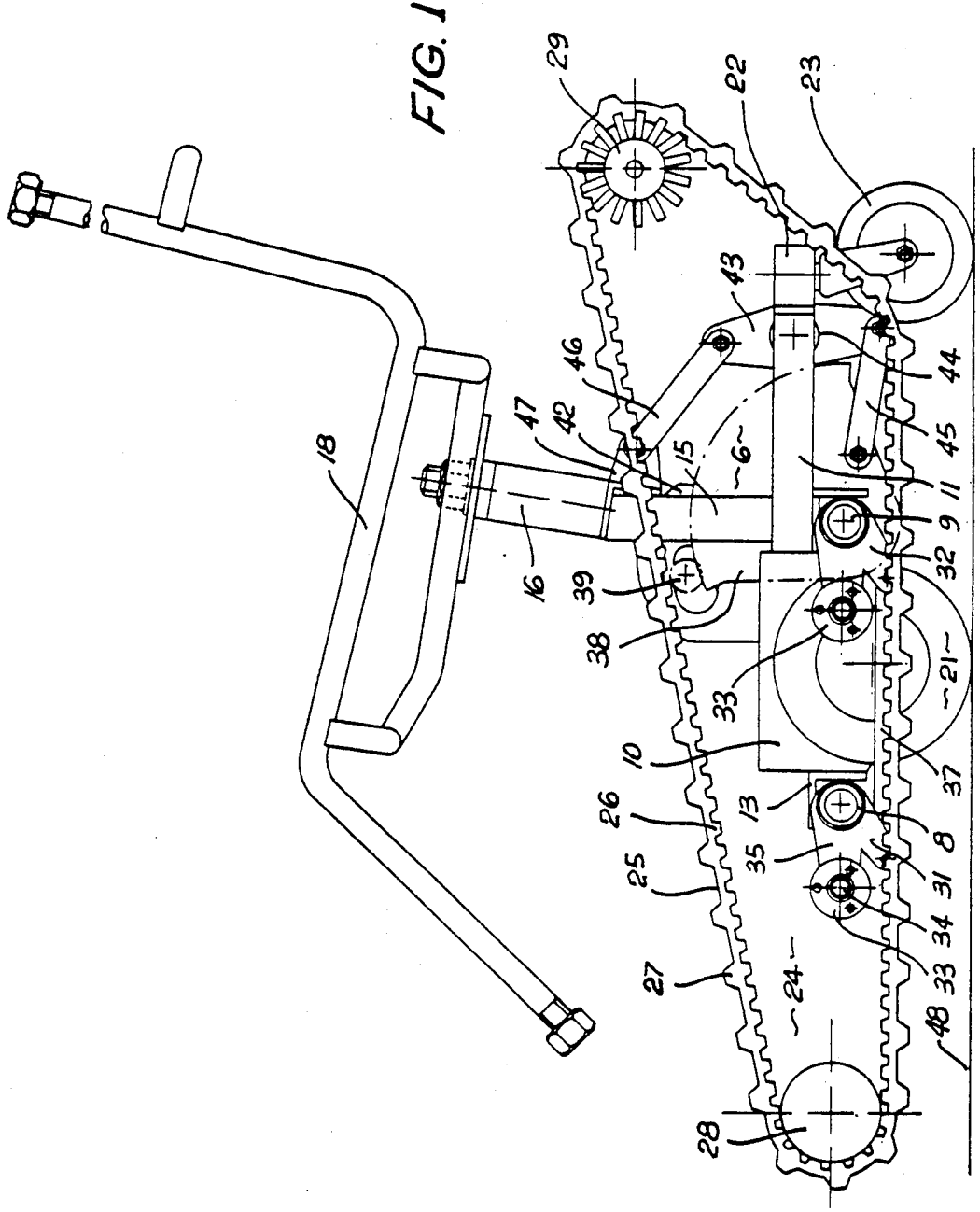
FIG. 1 is a side elevational view of the wheelchair of the present invention.

Referring to the drawings, the wheelchair of the present invention includes a chassis frame having side rails 6, center rail 7 and transverse shafts 8 and 9. Each side rail 6 includes a support plate portion 10 rigidly fixed to a rod portion 11. Center rail 7 extends only between shafts 8 and 9 mainly to act as a steadying influence on the frame to counteract lateral flexibility of plate portions 10 owing to their thinness. The rails 6 and 7 are furnished with bearing sleeves 12 fixed on the rails by way of angle members 13. Shafts 8 and 9 are rotatable within sleeves 12 and are restrained against endwise movement relative thereto by collars 14.

The upright support column consists of a yoke 15 and stem 16 fixed to the yoke. The lower end of the support column is thus in two parts, each of which is pivotally mounted on shaft 9 by way of bearing sleeves 17. The upper end of the support column is furnished with any suitable means for mounting a load carrier or chair 18 thereon.

Support plates 10 each carry an electric motor 19 having a stub drive shaft 20 with a front road wheel 21 keyed on it. The motors are powered by a battery carried on the wheelchair. Conventional controls (not shown) are provided so that the motors may be operated together in forward or reverse, or individually or oppositely for steering purposes. The rear ends of rod portions 11 carry vertical axis sleeves 22 for caster-type rear road wheels 23. Wheels 21 and 23 provide the conveyance with a first wheel base, being that wheel base which is effective during level floor travel of the conveyance, as indicated in FIG. 1.

Mounting plates 24 are placed at the sides of the chassis frame and both of them are closely and respectively encompassed by flexible crawler belts 25, having internal gear teeth 26 and external tread cleats 27. Belts 25 run about conventional idler pulleys freely rotatably mounted on plates 24. Two of these idler pulleys are indicated at 28. Belts 25 are separately or combinedly operable by drive pinions 29 each of which has its own motor 30 mounted on the associated mounting plate 24. Motors 30 are controllable in the same way as previously explained in connection with motors 19.

The mounting plates 24 are operatively connected to the chassis frame by way of front and rear bell cranks 31 and 32, respectively, keyed on shafts 8 and 9 so that bell cranks 31 will necessarily act as a single entity and bell cranks 32 will rotate when shaft 9 rotates. Each of the mounting plates 24 has bearing blocks 33 fixed on its inner side and these receive pins 34 on the bell crank arms 35. The bell crank arms 36, at each side of the chassis frame, are coupled together by connecting rods 37.

Shaft 9 has a sector gear 38 keyed on it, and this gear is in mesh with a drive pinion 39 keyed on stub shaft 40 of a motor 41 mounted on plate 42 fixedly mounted on frame member 7. A transmission lever 43 is fulcrumed at 44 between frame members 11. One arm of lever 43 is coupled to sector gear 38 by link 45, and the other arm of lever 43 is coupled, by link 46, to a lug 47 fixed on column 15/16.

The wheelchair as shown in FIG. 1 is conditioned for travel on a level surface; that is, with crawler belts 25 elevated above floor level 48.

Figure 2:
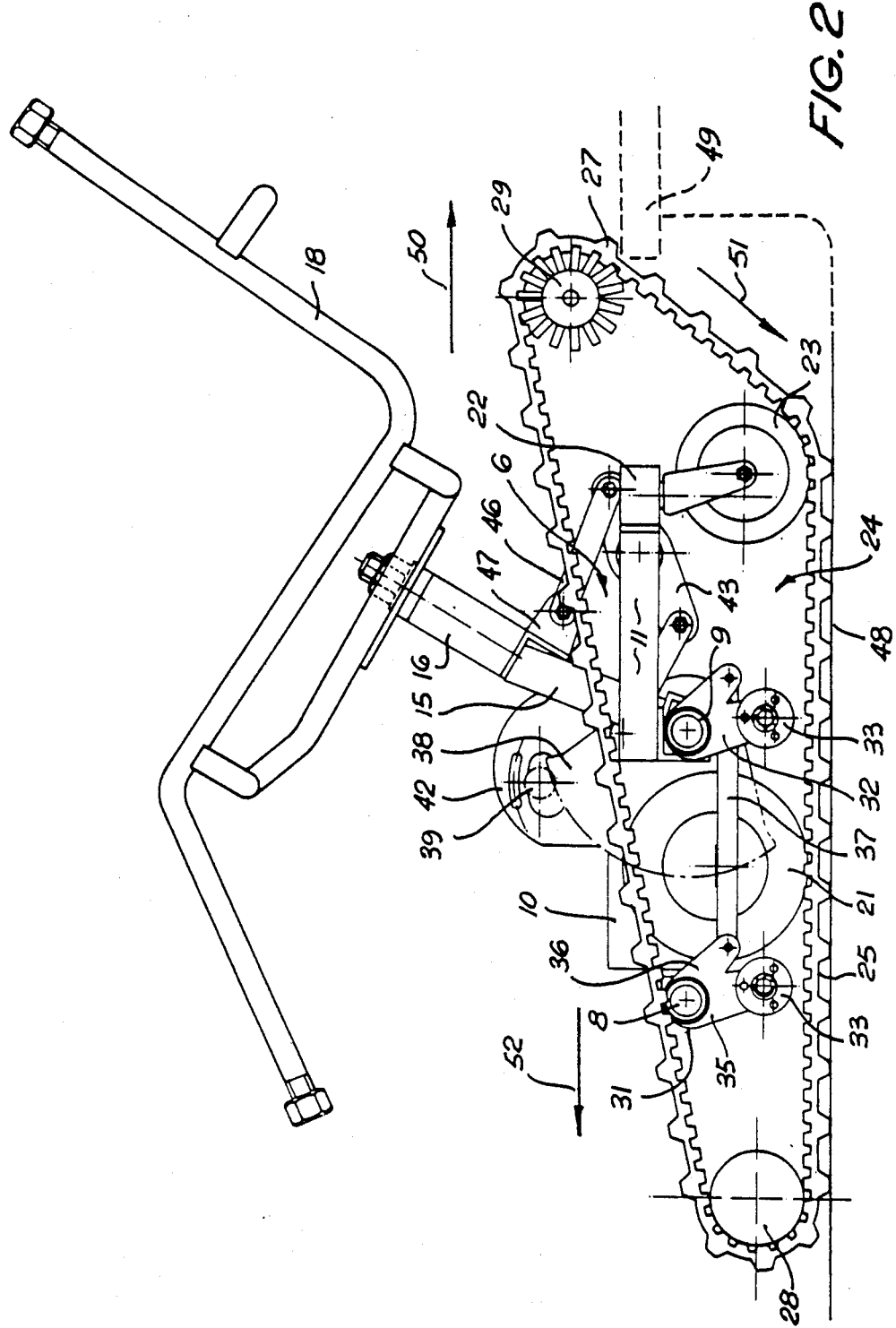
FIG. 2 is a view similar to FIG. 1 except for showing the wheelchair conditioned for up or down movements.

When a step 49 (FIG. 2), or a flight of stairs, is to be climbed, it is approached in the direction indicated by arrow 50 (FIG. 2). Just prior to arrival at the rise, motor 41 is energized so that the sector gear 38 is turned from the position shown for it in FIG. 1 to that shown in FIG. 2 thus acting through shaft 9 and bell cranks 31 and 32, lowering crawler belts 25 to floor level and elevating wheels 21 and 23 clear of that level. In this way the bottom flights of belts 25 become effective as another wheel base. During the wheel base change-over, the column 15/16 is swung about is pivot mount on shaft 9, through the agency of lever 43 and links 45 and 46, from its position shown in FIG. 1 to that shown in FIG. 2 so that the orientation of the load carrier or chair 18 is better suited to the climb, and at the same time the vertical axis of the center of gravity of the load carrier plus its load remain well within the lateral ambit of the second wheel base.

During the approach to the rise, the belts 25 are moving in the direction indicated by arrow 51 in FIG. 2 so that when stair contact is made the cleats 27 ensure performance of the climb. When a descent is to be made the same procedure is followed except that the descent is approached in the direction indicated by arrow 52 in FIG. 2.

The pinion 39 which causes rotation of the sector gear 38 to effect a wheel base change-over is preferably motor-driven by motor 41. The shaft 40 on which pinion 39 is mounted could carry a worm gear meshed by a worm on a shaft manually rotatable by a hand-wheel or the like.

Figure 6:
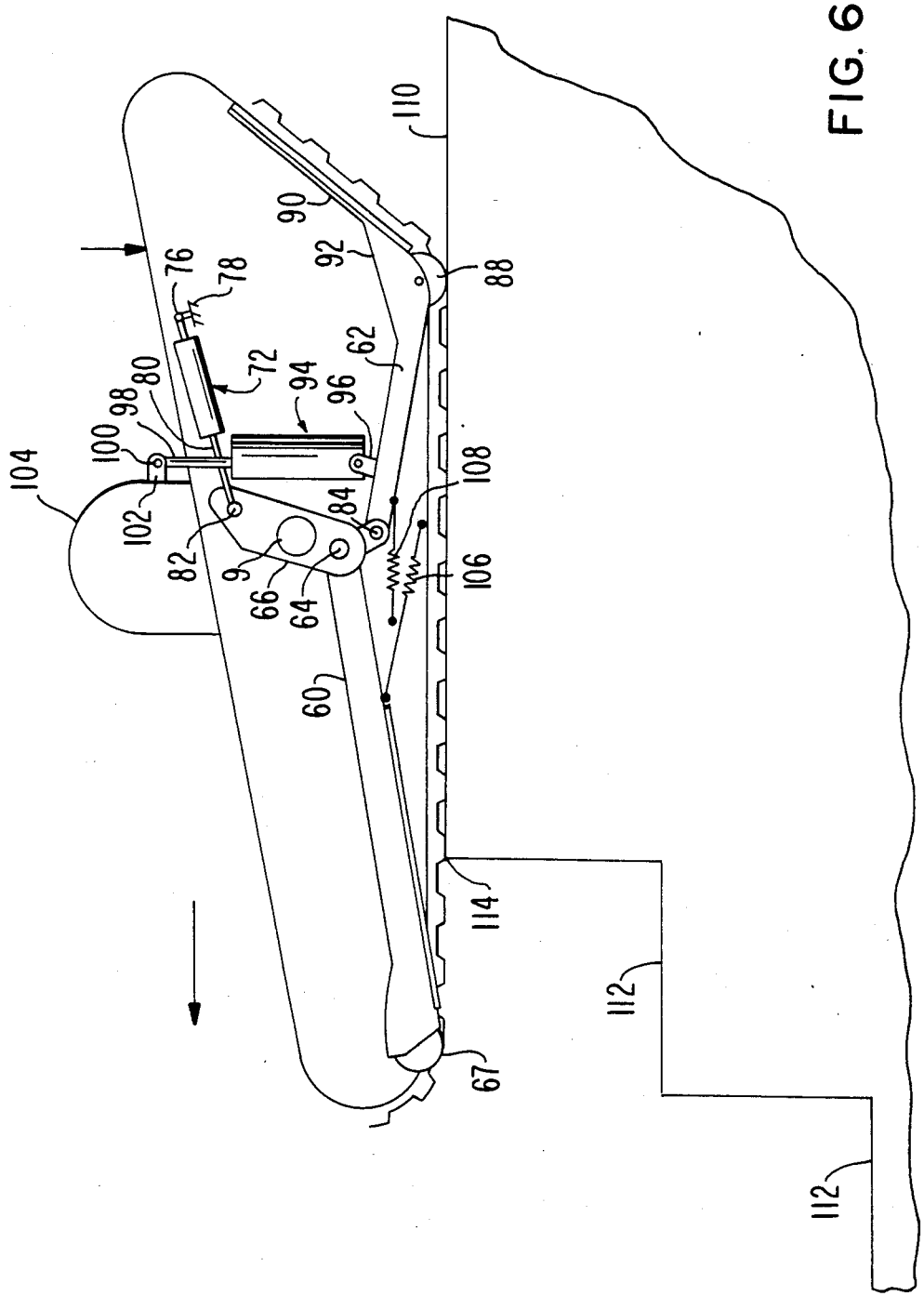
FIG. 6 is a schematic side elevational view of the wheelchair on a horizontal path and showing the cushioning means thereof.

FIG. 6 shows means for cushioning the wheelchair as it goes up or goes down the stair steps of a stairway. To this end, the cushioning means includes a first arm 60 for the front end of the wheelchair and a second arm 62 for the rear end thereof. The arms 60 and 62 are located in the interior of the wheelchair at locations where the arms do not interfere with the other moving parts of the wheelchair itself.

Arm 60 is pivotally mounted by a pin 64 on the lower end of a link 66 which is pivotally coupled on shaft 9. The arm 60 extends forwardly from link 66 and has a roller 67 on the forwardmost end thereof. A piston and cylinder assembly 72 is associated with arm 60 for serving as a dash pot or shock absorber for arm 60. To this end, one end of piston and cylinder assembly 72 is pivotally mounted by a pin 76 on a fixed location 78 on the wheelchair. A piston rod 80 extends outwardly from piston 72 and is pivotally coupled by a pin 82 on the upper end of link 66. Details of the piston and cylinder assembly 72 are shown in more detail in FIGS. 11 and 12.

Arm 62 is pivotally mounted by a pin 84 on a tab 86 rigid to and extending downwardly from the end of link 66 adjacent to pin 64. Arm 62 has a roller 88 at the outer end thereof and a plate 90 extending at an angle from the outer end 92 thereof.

A fluid piston and cylinder assembly 94 is secured to arm 62 by a link 96. Piston and cylinder assembly 94 is of substantially the same construction as that of piston and cylinder assembly 72, thus, assembly 94 is detailed in FIGS. 11 and 12.

Assembly 94 includes a piston rod 98 which is pivotally secured by a pin 100 on a tab 102 secured in any suitable manner to a fixed location 104 on the wheelchair.

A first spring 106 biases arm 60 in a counterclockwise sense when viewing FIG. 6. Similarly, a coil spring 108 biases arm 62 in a clockwise sense when viewing FIG. 6. The ends of both springs remote from respective arms are secured in any suitable manner to fixed locations on the wheelchair.

To indicate the operation of the cushioning means embodied in arms 60 and 62 and assemblies 72 and 94, reference is had first to FIG. 6 which illustrates the wheelchair on a landing 110 of a stairway having steps 112. As the wheelchair moves to the left when viewing FIG. 6, arm 60 continues to engage the upper edge 114 of landing 110. Arm 60 moves into the position shown in FIG. 7 where the arm engages the upper edge 114 of the first step 112. At this time, the center of gravity of the wheelchair is at a location, for instance, denoted by the numeral 116 (FIG. 7) wherein the center of gravity almost passes the upper edge 114 of landing 110.

Figure 7:
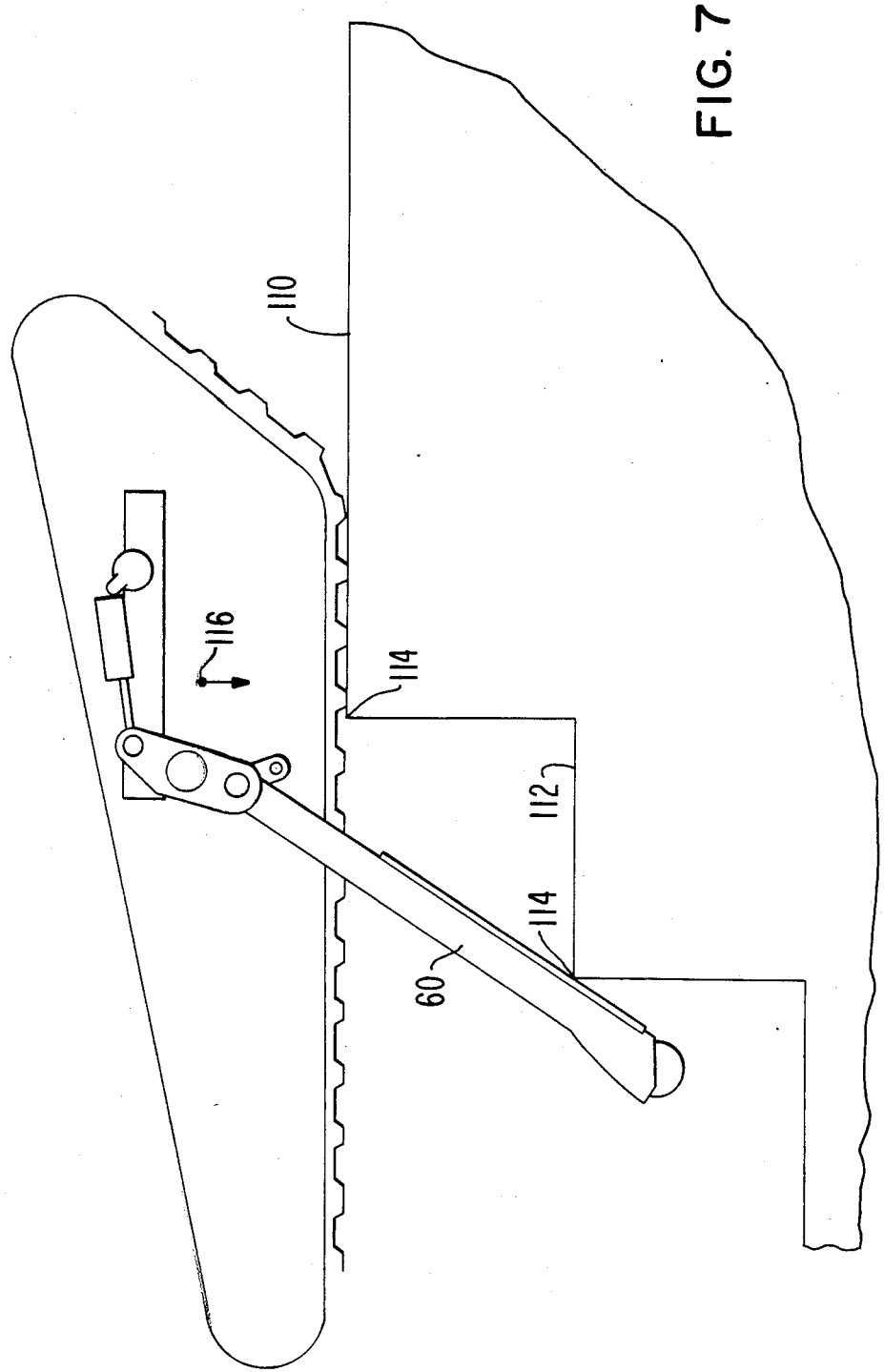
FIG. 7 is a view similar to FIG. 6 but showing the cushioning means ready to cushion the movement of the wheelchair as it moves into an inclined position.
Figure 8:
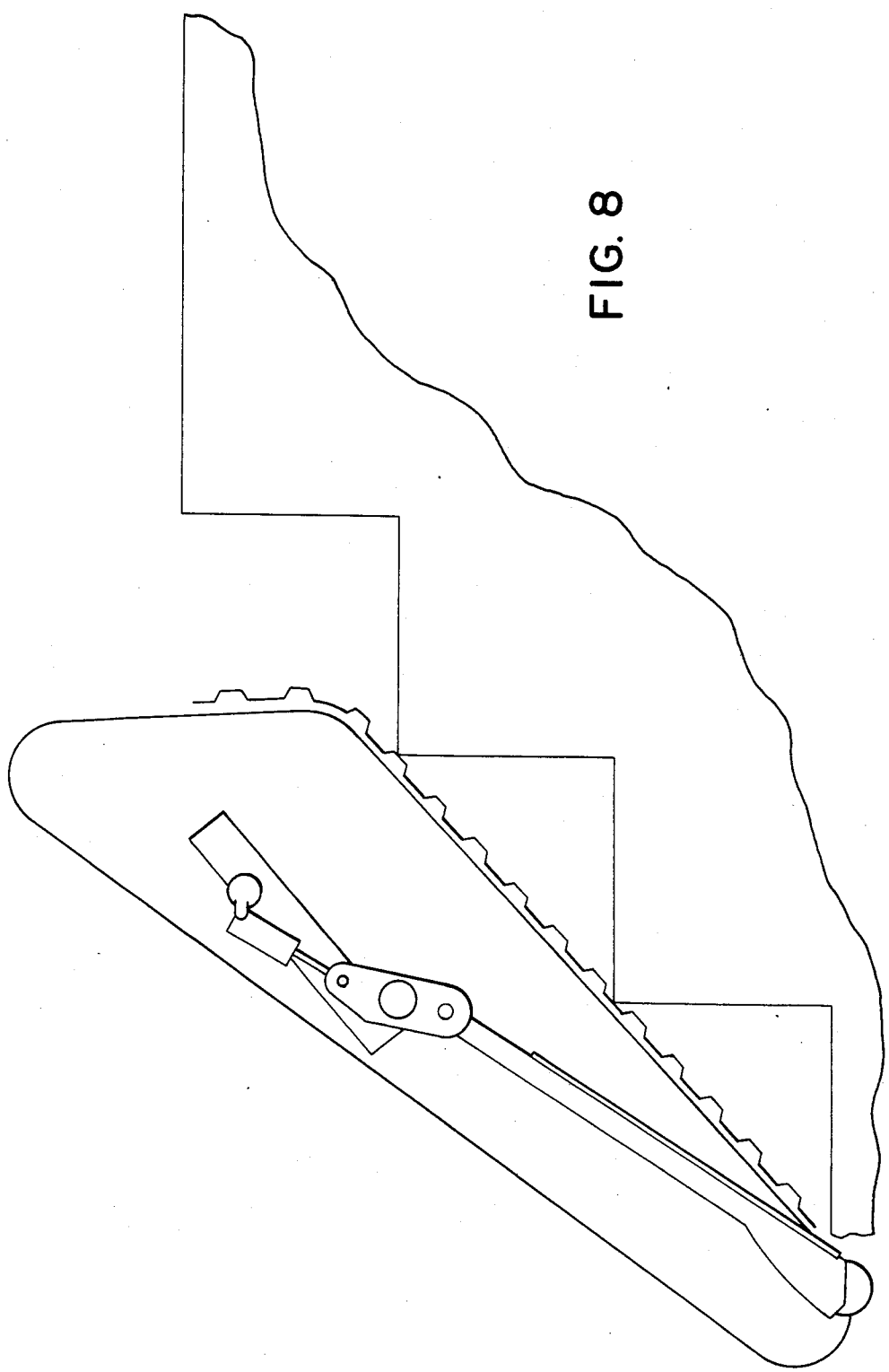
FIG. 8 is a view similar to FIGS. 6 and 7 but showing the wheelchair in its inclined position.

As the center of gravity passes beyond the upper edge 114 of landing 110, the wheelchair commences to pivot downwardly and as it does, arm 60 is in engagement with the leading edge 114 of step 112 so that the arm 60 remains in an inclined, generally fixed position as the rest of the wheelchair pivots of the wheelchair in a counterclockwise sense when viewing FIG. 7. As it does so, assembly 72 cushions the pivotal movement in a clockwise sense of the wheelchair because the end of the cylinder of assembly 72 is coupled rigidly to the wheelchair at point 78 so that the wheelchair assumes eventually an inclined position as shown in FIG. 8 as it descends the stairs 112. However, during the time when the wheelchair is moving from the position shown in FIG. 7 to the position shown in FIG. 8, the cushioning effect occurs because the rate of pivotal movement of the wheelchair in a clockwise sense is decreased or slowed down, thereby gently easing the wheelchair and its occupant into the inclined position of FIG. 8. Without arm 60 and assembly 72, this counterclockwise pivotal movement of the wheelchair would be quite rapid and the tracks of the wheelchair would slam into the leading edges 114 of the upper two stair steps 112 and possibly discomfort to the wheelchair occupant or even cause bodily injury to the occupant.

In climbing the stairway, the wheelchair is assumed to be in the inclined position of FIG. 8, in which the arm 60 successively engages the upper edges 114 of steps 112 until the wheelchair is in the horizontal position shown in FIG. 6, whereupon the roller 67 on arm 60 engages landing surface 110 at all times even when the tracks are raised.

To illustrate the cushioning effect of the arm 62 and assembly 94, reference is had first to FIG. 9 which shows arm 62 in its down position with the wheelchair in a stair-climbing inclined position. In such a case, the plate 90 on the outer end of arm 62 successively engages the edges 114 of steps 112 until the arm reaches the upper landing surface 110 of the stairway, whereupon roller 88 will engage and roll over surface 110 as the wheelchair approaches landing surface 110. Eventually, the center of gravity 116 (FIG. 7) of the wheelchair will pass to the right of the uppermost edge 114 and the wheelchair will rotate in a clockwise sense into the horizontal position shown in FIG. 6. When this occurs, arm 62 will rotate in a counterclockwise sense when viewing FIG. 9 and this will cause a cushioning effect due to the movement of the piston rod 98 into the cylinder of assembly 94 to cause a gentle lowering of the right-hand end of the wheelchair rather than an abrupt downward movement which could cause discomfort to or injure the occupant. When the wheelchair is in the position of FIG. 6, it can move to the right, whereupon the tracks can be elevated and the ground-engaging wheels of the system are once more lowered into position for rolling engagement over the flat surface.

Each of assemblies 72 and 74 is constructed in the manner shown in FIGS. 10–12. Each of the assemblies includes a cylinder 120 having a bore 122 through which a piston 124 moves, the piston being secured to a piston rod, such as rod 80 of assembly 72. The piston has O-rings 124 for sealing purposes. Moreover, the piston has a fluid passage 126 therethrough which is closed, as shown in FIG. 11, when the outer surface 128 of a reduced portion 130 of the piston rod 80 is within the piston 124, portion 130 being relatively shiftable through a limited short distance because the nut 132 threadably coupled on the innermost end of portion 130 leaves a space so that, when piston rod 80 is pulled to the right when viewing FIG. 12, there will be relative movement between the piston rod and the piston 124 until nut 132 engages the rear face 134 of piston 124. When this occurs, the passage surface 128 is spaced from the tubular passage 126, thereby opening the passage 126.

Even when nut 132 engages surface 134, the pressures on opposite sides of the piston will be equalized since the nut 132 has holes (not shown) through it which allow fluid communication between passage 126 and the left-hand side of the piston when viewing FIG. 12. Thus, since the pressures are the same on opposite sides of the piston, the piston rod 80 is moved out of the cylinder easily and from the position shown in FIG. 6 to the position shown in FIG. 7 under the influence of spring 106 readily and without delay. Similarly, as arm 62 moves downwardly, piston rod 98 emerges from the cylinder of assembly 94 quickly and easily and without delay. The arm 62 will be pulled downwardly by the bias force of spring 108 (FIG. 6).

Cylinder 120 of FIGS. 11–13 has a pair of fluid passages 136 and 136, passage 136 having a passage 140 which communicates with the interior of bore 122 of the cylinder. A threaded plug 142 is threaded into the bore 144 coaxial with passage 136 and the plug can be adjustably placed in the bore so that the clearance between the end face 146 of plug 142 can be adjusted with reference to a valve seat 147 as shown in FIG. 10. The opposite end of passage 136 is in fluid communication with a short passage 148 which communicates with the end of the bore 122 nearest the end at which the piston rod extends outwardly from the cylinder.

Figure 3:
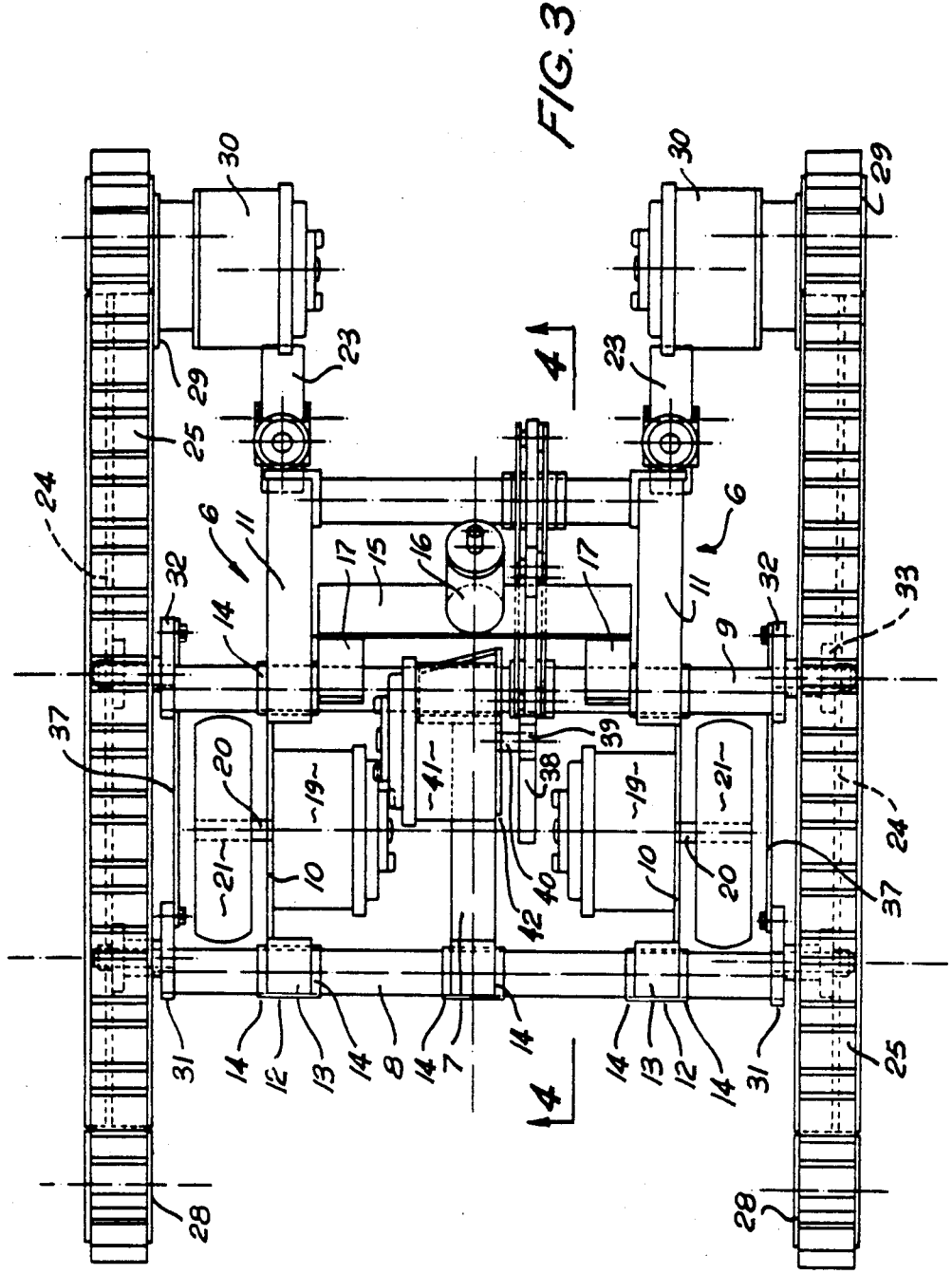
FIG. 3 is a plan view of the wheelchair drive mechanism.
Figure 4:
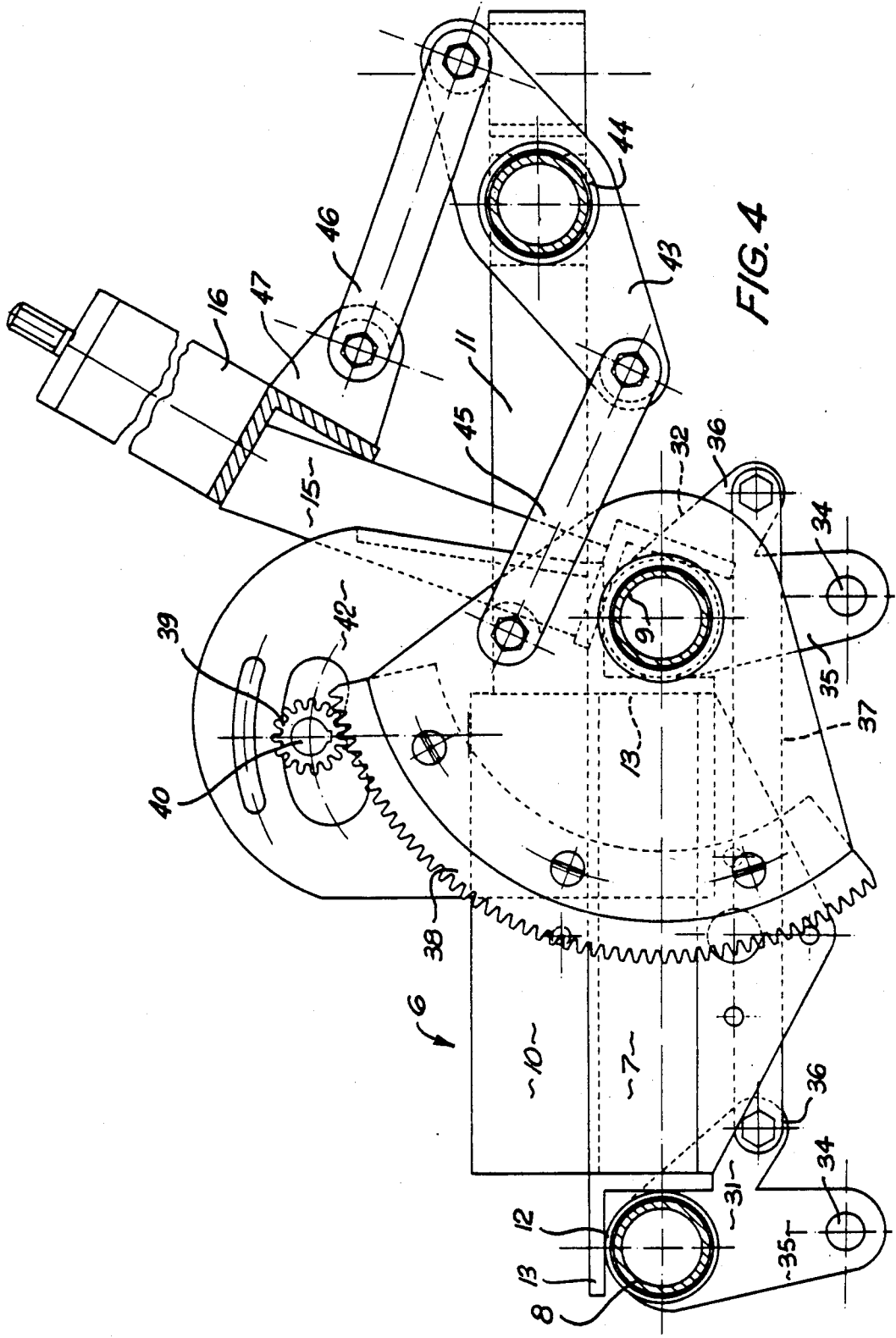
FIG. 4 is a vertical section, on an enlarged scale, taken on line 4—4 of FIG. 3.
Figure 5:
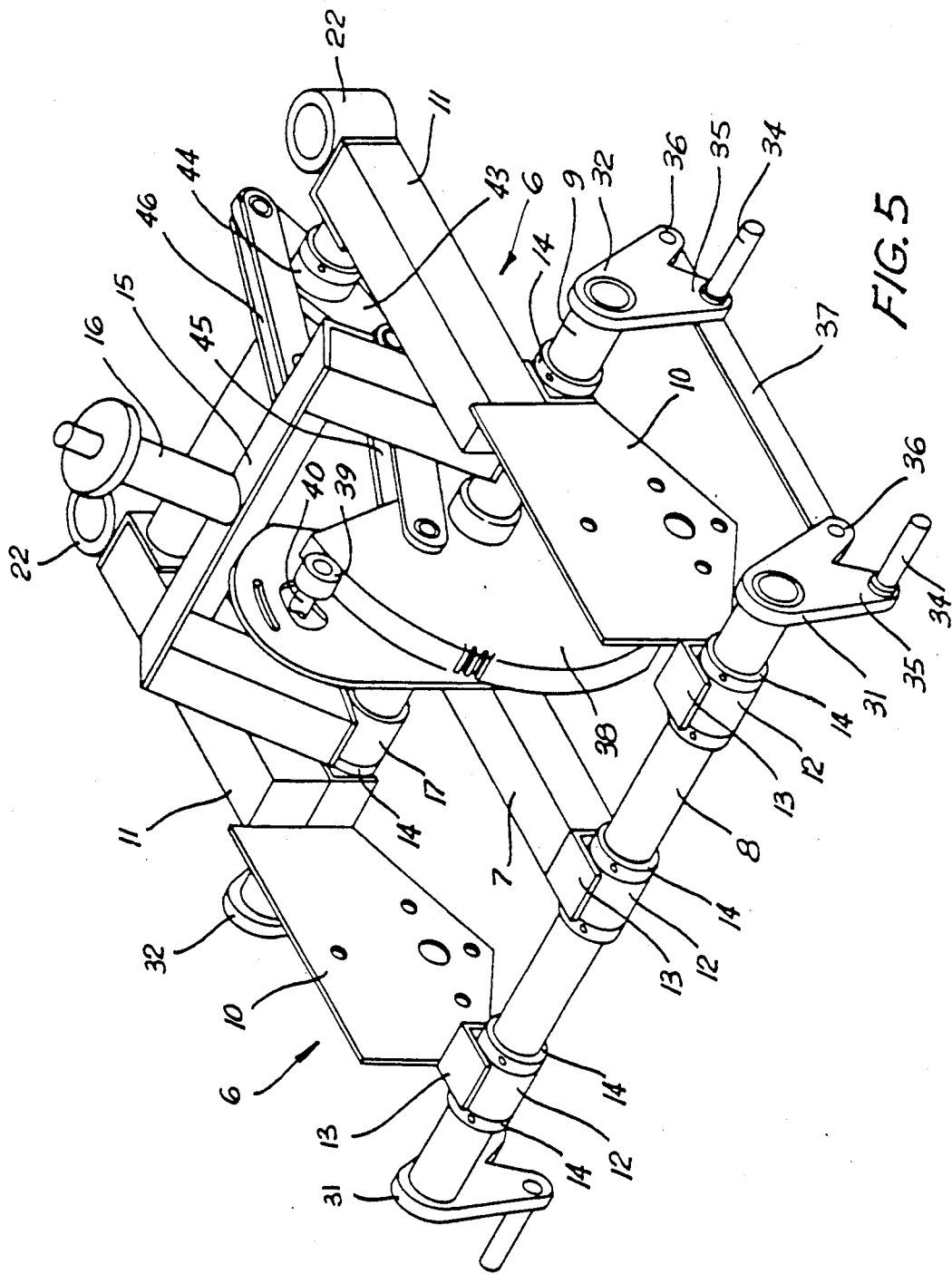
FIG. 5 is a perspective showing of some of the parts already shown in the earlier figures.

Passage 138 is connected by short passage 150 to bore 122 and a spool valve 152 is slidably mounted in passage 138 and has a reduced portion to present an annular fluid passage 154 (FIG. 11). A side passage 156 places passage 138 in fluid communication with passage 136; however, the length of the reduced portion of spool valve 152 is such that if the valve is pushed to the left when viewing FIG. 3, bore 156 is closed off and there is no fluid communication between passages 136 and 138. When this occurs, the hydraulic fluid leaving the left-hand side of the cylinder when viewing FIG. 12 must pass to the right and side by way of passage 140, passage 136 and passage 138 back into cylinder 122. This occurs when rod 80 is pushed to the left when viewing FIG. 12, thereby providing the cushioning effect mentioned above with respect to the upward movements of arms 60 and 62 (FIG. 6) relative to the wheelchair.

We claim:
1. Mobile apparatus comprising:
a central support;
a pair of side supports on respective sides of the central support;
means pivotally mounting the central support on each side support, respectively, said mounting means allowing the central support and each side support to move relative to each other;
means coupled with the supports for moving the side supports relative to each other;
wheel means coupled to the central support for moving the same over a surface;
means carried by the central support for driving said wheel means;
an endless flexible track for each side support, respectively, each track being mounted on the side support for movement over a surface;
means coupled with each track, respectively, for moving the track relative to the respective side supports, the supports and tracks being operable for movement along a horizontal path and along an inclined path; and
means between the tracks and extending longitudinally thereof for cushioning the movements of the supports and tracks as they move from horizontal to inclined positions and from inclined to horizontal positions.

2. Apparatus as set forth in claim 1, wherein the cushioning means includes a first arm pivotally coupled to and extending forwardly from the central support and a second arm pivotally secured to the central support and extending rearwardly therefrom.

3. Apparatus as set forth in claim 2, wherein is included a piston and cylinder assembly for each arm, respectively, one end of each assembly being coupled to the respective arm and the other end of each assembly being coupled to one of the supports.

4. Apparatus as set forth in claim 2, wherein is provided means for each arm, respectively for biasing the same in a predetermined direction.

5. Apparatus as set forth in claim 4, wherein said bias means includes a spring coupled to respective arms and to one of the supports.

* * * * *